March 1, 1932. F. H. RAGAN 1,847,848

METHOD OF MAKING WORM GEARS

Filed July 26, 1927

INVENTOR.
Frederick H. Ragan
BY
Fay, Oberlin & Fay
ATTORNEYS.

Patented Mar. 1, 1932

1,847,848

UNITED STATES PATENT OFFICE

FREDERICK H. RAGAN, OF SHAKER HEIGHTS, OHIO, ASSIGNOR TO THE COLUMBIA AXLE COMPANY, OF CLEVELAND, OHIO, A CORPORATION OF OHIO

METHOD OF MAKING WORM GEARS

Application filed July 26, 1927. Serial No. 208,519.

The principal object of this invention is to eliminate the trouble caused by inaccuracies in worm gears such as are now in use.

Another object is to provide means whereby the rough-cut gear teeth may be accurately shaped, and whereby said teeth may be simultaneously burnished and densified or compressed or hardened.

A further object is to provide a novel tool, through the use of which the rough-cut teeth of a worm gear may be simultaneously shaped, burnished and hardened, all in a very short time and with a minimum of labor.

A still further object is to provide means for quickly and efficiently shaping, burnishing and ironing out the minor surface inaccuracies of the rough-cut teeth of a worm gear without the use of skilled labor.

A still further object is to provide a novel method of manufacturing accurately shaped worm gears.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

Figure 1:
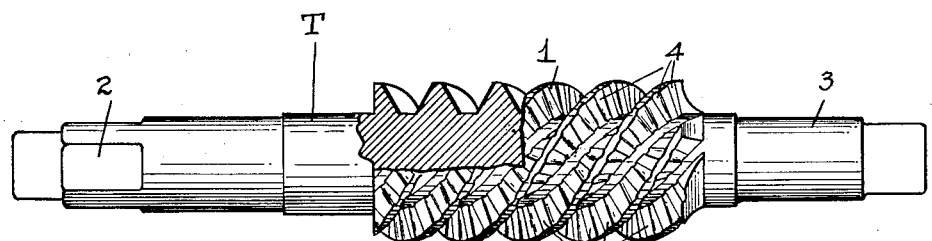
Figure 2:
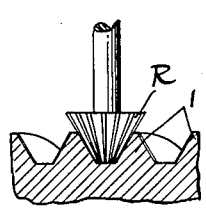
Figure 3:
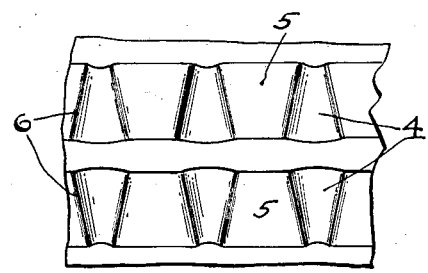
Figure 4:
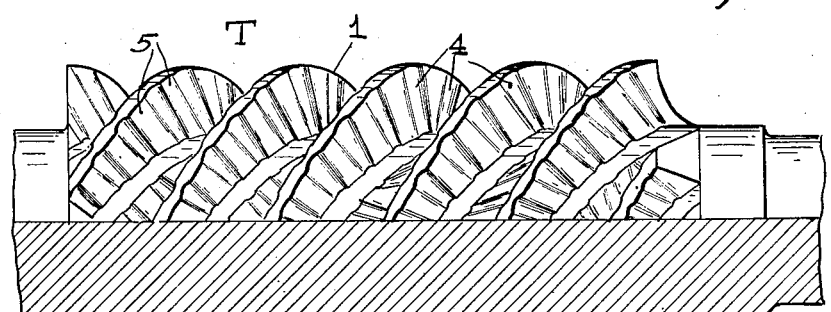
Figure 4:
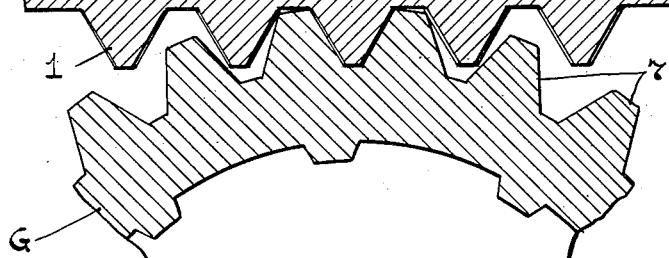

In said annexed drawings:

Fig. 1 is an elevation of the tool which is used in the practice of my invention, a portion thereof being shown in section; Fig. 2 is a fragmentary vertical section through said tool, showing a portion of the conical reamer as it reaches the end of the stroke in forming one pair of the grooves described below; Fig. 3 is an enlarged fragmentary plan view of one of the threads of said tool; and Fig. 4 is an elevation, partly in section, of said tool installed in engagement with the gear.

The common practice in the cutting of bronze worm gears up to the present time involves starting with a steel hob, which is purposely left somewhat oversize in order to provide for regrinding. The use of an oversize hob prevents an accurate contact between the worm and the gear teeth, and at best never gives anything but an approximation of the true size and contour of worm. The result of the use of a worm gear cut by a hob which is oversize is the production of objectionable noise from backlash when run with a worm and the complete failure of any true or accurate contact between the worm and the teeth of the worm gear. The present invention adds one minor and inexpensive step to the manufacturing process and eliminates the above described objectionable results in the ordinary practice and produces a true and theoretically accurate worm gear, which is thus enabled to have a true and full contact with the worm.

The tool T comprises a very accurately made and ground master steel worm having threads 1, a polygonal end 2 for engagement in the rotatable chuck (not shown) and a cylindrical end 3 for engagement in a bearing (not shown). The opposite lateral faces of threads 1 are formed with alternating grooves 4 and lands 5, which grooves 4 are formed by an appropriately coned reamer R. The edges of the grooves are rounded off, as indicated at 6 in Fig. 3.

The gear G is rough-cut in the well-known manner, and is then mounted on the shaft S with its teeth 7 in engagement with the threads 1 of the tool T, said tool having been mounted in a machine adapted to rotate it. A powerful brake B is applied to the shaft S. By adjustment, the teeth 7 and threads 1 are brought into such relation that they bear against each other with a relatively heavy pressure. The relationship into which the teeth and the threads are brought is an accurate theoretical relationship so that a ground worm which is easily made theoretically correct will register in exactly the same relationship when substituted for the burnishing tool T. The tool T is then rotated at high speed for about thirty seconds, the brake B being applied to impose a load between the teeth of the gear and the threads of the tool.

Through coaction of the threads 1 with the teeth 7, the gear G is also rotated. As the lateral faces of the threads 1 come into contact with the individual lateral faces of the teeth 7, the lands exert heavy pressure on relatively small areas of the tooth surfaces and cause the metal of said surfaces to flow into place. This action, of course, results in a smoothing and densifying of the surfaces of the teeth as well as in shaping the teeth to absolute accuracy.

The worm is rotated first in one direction to burnish one side of each of the teeth of the gear, and then the operating mechanism is reversed to burnish the other side of each tooth. Experiments have shown that the use of my tool in the above outlined manner for a very short time will entirely eliminate the inaccuracies of the gear, and will produce a gear which will run, when first installed, without any noises such as are produced by the old and inaccurate gears.

It will be apparent that either complete worm gears or sectors thereof may be subjected to the finishing or burnishing operation described above, and in many cases where only sectors are employed these can be very readily and quickly brought into a condition where they will have a true and accurate engagement with an accurately cut and ground worm by the present method.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The method of making a worm gear which consists in cutting the gear with a hob, and then flowing the surface metal of the teeth into accurate shape by means of a burnishing worm having grooves formed in the lateral faces of its threads extending transversely of the direction of relative movement between the contacting faces of said gear and worm.

2. The method of making a worm gear which consists in cutting the gear with a hob, and then flowing the surface metal of the teeth into accurate shape by means of a burnishing worm having round-edged grooves in the lateral faces of its threads extending transversely of the direction of relative movement between the contacting faces of said gear and worm.

3. The method of making a worm gear which consists in cutting the gear with a hob, mounting said gear to rotate on a shaft, bringing a rotatable tool into cooperative relation with said gear, said tool comprising a worm having threads for co-action with the teeth of said gear, said threads being formed, on their lateral faces, with round-edged grooves, and rotating said tool to cause relative movement between contacting surfaces of said gear and worm transversely of the direction of said groves to cause the surface metal of said teeth to flow into accurate shape, and to burnish and temper said surface metal.

4. The method of making a worm gear which consists in cutting the gear with a hob, mounting said gear to rotate on a shaft with which a brake is engaged, bringing a rotatable tool provided with round-edged grooves into cooperative relation with said gear, said tool being so formed that when it is rotated it will cause the rotation of said gear and relative movement between the contacting faces of said tool and gear in a direction transversely of said grooves, and rotating said tool while applying said brake to cause the surface metal of the teeth of said gear to flow into accurate shape.

Signed by me this 22nd day of July, 1927.

FREDERICK H. RAGAN.